US009130395B2

(12) United States Patent
Jung

(10) Patent No.: US 9,130,395 B2
(45) Date of Patent: Sep. 8, 2015

(54) NON-CONTACT CHARGING STATION WITH PLANAR SPIRAL POWER TRANSMISSION COIL AND METHOD FOR CONTROLLING THE SAME

(75) Inventor: Chun-Kil Jung, Seoul (KR)

(73) Assignee: HANRIM POSTECH CO., LTD., Suwon-Si, Gyeonggi-Do (KR)

(*) Notice: Subject to any disclaimer, the term of this patent is extended or adjusted under 35 U.S.C. 154(b) by 0 days.

(21) Appl. No.: 13/344,741

(22) Filed: Jan. 6, 2012

(65) Prior Publication Data

US 2012/0098486 A1   Apr. 26, 2012

Related U.S. Application Data

(63) Continuation-in-part of application No. 12/674,948, filed as application No. PCT/KR2009/002003 on Apr. 17, 2009.

(30) Foreign Application Priority Data

Dec. 12, 2008 (KR) .................. 10-2008-0126270
Dec. 22, 2008 (KR) .................. 10-2008-0131043
Dec. 22, 2008 (KR) .................. 10-2008-0131328

(51) Int. Cl.
*H02J 7/00* (2006.01)
*H02J 7/02* (2006.01)
*H02J 5/00* (2006.01)

(52) U.S. Cl.
CPC .......... *H02J 7/025* (2013.01); *H02J 5/005* (2013.01)

(58) Field of Classification Search
CPC ........................................................ H02J 5/005
USPC ........................................................ 320/108
See application file for complete search history.

(56) References Cited

U.S. PATENT DOCUMENTS 6,040,680 A    3/2000  Toya et al. ................... 320/108
7,907,043 B2*  3/2011  Mori ............................ 336/200

(Continued)

FOREIGN PATENT DOCUMENTS

JP    3-215134    9/1991
JP    05-128324   5/1993

(Continued)

OTHER PUBLICATIONS

U.S. Appl. No. 12/674,948, filed Feb. 24, 2010, Jung, Chun-Kil Jung.

(Continued)

*Primary Examiner* — Edward Tso
*Assistant Examiner* — Johali Torres Ruiz
(74) *Attorney, Agent, or Firm* — Stein IP LLC

(57) ABSTRACT

Various embodiments of a non-contact power transmission station with a planar spiral power transmission coil are disclosed. In one exemplary embodiment, a non-contact power transmission station may include: a transmission controller for transmitting power to a non-contact power-receiving apparatus and transmitting/receiving data; and a station part electrically connected with the transmission controller to generate an induced magnetic field and transmit power to the non-contact power-receiving apparatus, which is disposed on a top thereof. The station part may include a primary core where the induced magnetic field is generated. The primary core may include a core base, a central coil and two side coils which are fastened to the station part. The central coil and the two side coils may selectively generate an induced magnetic field under control of the transmission controller.

8 Claims, 15 Drawing Sheets

(56) References Cited

U.S. PATENT DOCUMENTS

| | | |
|---|---|---|
| 8,169,185 B2* | 5/2012 | Partovi et al. ............... 320/108 |
| 2002/0003980 A1 | 1/2002 | Takano et al. ............... 399/320 |
| 2002/0014938 A1* | 2/2002 | Westphal et al. ............. 335/301 |
| 2004/0145342 A1* | 7/2004 | Lyon .......................... 320/108 |
| 2005/0068019 A1 | 3/2005 | Nakamura et al. ........... 323/355 |
| 2006/0080825 A1 | 4/2006 | Pille ............................ 29/592 |
| 2006/0145660 A1* | 7/2006 | Black et al. .................. 320/108 |
| 2006/0202665 A1* | 9/2006 | Hsu ............................ 320/139 |
| 2006/0251203 A1* | 11/2006 | Okamura et al. ............. 376/287 |
| 2007/0044370 A1* | 3/2007 | Shoji .......................... 43/44.98 |
| 2008/0061733 A1* | 3/2008 | Toya ........................... 320/103 |
| 2008/0067874 A1 | 3/2008 | Tseng ......................... 307/104 |
| 2008/0111518 A1 | 5/2008 | Toya ........................... 320/108 |
| 2008/0197802 A1 | 8/2008 | Onishi et al. ................. 320/106 |
| 2008/0205919 A1* | 8/2008 | Takagi ......................... 399/50 |
| 2008/0224656 A1 | 9/2008 | Schulz ........................ 320/108 |
| 2008/0278112 A1* | 11/2008 | Hui et al. ..................... 320/108 |
| 2009/0267558 A1* | 10/2009 | Jung ........................... 320/108 |
| 2009/0290332 A1 | 11/2009 | Jacobs et al. ................. 362/183 |

FOREIGN PATENT DOCUMENTS

| | | |
|---|---|---|
| JP | 11-289692 | 10/1999 |
| JP | 2001-274527 | 10/2001 |
| JP | 2002-10535 A | 1/2002 |
| JP | 2005-110399 A | 4/2005 |
| JP | 2005-110421 A | 4/2005 |
| JP | 2006-246633 A | 9/2006 |
| JP | 2006-282473 | 10/2006 |
| KR | 20-0357251 | 7/2004 |
| KR | 10-2008-0012782 | 2/2008 |
| KR | 10-0836631 | 6/2008 |
| WO | WO 2008/050917 | 5/2008 |
| WO | WO 2008/137996 | 11/2008 |

OTHER PUBLICATIONS

Japanese Office Action dated Jan. 8, 2013, issued in corresponding Japanese Application No. 2011-540588.

Supplementary European Search Report mailed Sep. 30, 2013, issued in corresponding European Patent Application No. 09 808 926.1.

Office Action issued by the USPTO on Nov. 19, 2013 for the corresponding U.S. Appl. No. 12/674,948.

U.S. Appl. No. 12/674,948, filed Feb. 24, 2010, Chun-Kil Jung, Spacon Co., Ltd.

Office Action issued by the USPTO on Apr. 21, 2014 for the corresponding U.S. Appl. No. 12/674,948.

Non-Final Office Action issued to U.S. Appl. No. 12/674,948 on Jun. 27, 2012.

Non-Final Office Action issued to U.S. Appl. No. 12/674,948 on Jan. 10, 2013.

Office Action issued by SIPO on Aug. 5, 2014 for the corresponding Chinese Application No. 201310042301.6.

Office Action issued by JPO on Sep. 24, 2014 for the corresponding Japanese Application No. 2013-191812.

Office Action issued by JPO on Feb. 24, 2015 for the corresponding JP Application No. 2013-191812.

* cited by examiner

NON-CONTACT CHARGING STATION WITH PLANAR SPIRAL POWER TRANSMISSION COIL AND METHOD FOR CONTROLLING THE SAME

This is a continuation-in-part of application Ser. No. 12/674,948, filed Feb. 24, 2010, the disclosure of which is incorporated herein by reference.

TECHNICAL FIELD

The present invention relates to a non-contact charging station with a planar spiral power transmission coil and a method for controlling the same. More particularly, a primary side core of the non-contact charging station for transmitting a power signal to a portable device using an induced magnetic field may have a planar spiral coil structure. The planar spiral power transmission coil has a simplified shape along with improved applicability that may facilitate mounting to a non-contact charger. In addition, since a plurality of the planar spiral coils for charging may be provided in a single charging station, the charging operation can be continuously performed and may enable reliable charging even when a power receiving apparatus or a non-contact battery pack is moved from one position to another and/or is not placed in a correct charging position on the station.

DESCRIPTION OF RELATED ART

In general, portable devices, such as a cellular phone, a Personal Digital Assistants (PDA), a Portable Media Player (PMP), a Digital Multimedia Broadcasting (DMB) terminal, an MP3 player and a notebook computer, cannot be kept plugged into a regular power source at home or in an office since they are mostly used while users are moving. Accordingly, such a portable device is equipped with a disposable battery (i.e., a primary battery) or a rechargeable battery (i.e., a secondary battery). To recharge a battery or a battery pack of a portable device using electric power supplied from a regular power source, a method of supplying the electric power to the portable device via a power supply line or power supply connector has been traditionally used.

However, where the electric power is supplied to the portable device via a connector, an instant power discharge may occur due to a potential difference between the connector and the battery when the charger and the battery are connected to or disconnected from each other.

The instantaneous discharge may cause impurities to accumulate on both the connectors, thus resulting in a fire hazard.

In addition, since the connectors are directly exposed to air, moisture or dust adheres to the connectors, thereby causing a natural discharge. As a result, the lifetime and performance of the charger and the battery may deteriorate.

In order to overcome problems related to the method of supplying electric power via the connectors, non-contact chargers have been developed. When a terminal containing a battery to be charged is placed on the primary coil of a charger, a secondary coil of a battery is charged. In this case, electric power is charged by inducing an electromagnetic force on the secondary coil using a magnetic field generated from the primary coil.

However, the non-contact charger of the related art can merely supply electric power to the portable device and its use is limited since it is not used for other applications.

The magnetic field generated from the primary coil changes when a metal body is placed inside it. Then, a considerable amount of power loss, which may damage the non-contact charger, occurs in the primary coil.

Since an excessive current flowing through the secondary coil and the circuit of the battery pack generates heat, the battery pack may explode due to excessive heat.

Furthermore, since most of the primary and secondary cores are implemented with one thick coil, the charger becomes bulky and has a complicated structure and is difficult to manufacture. Mounting the charger on the portable device is often difficult because the portable device contains a number of semiconductor elements in addition to the battery pack. Moreover, heat or a magnetic field may interfere with a plurality of controllers and members, thereby causing them to malfunction.

In addition, the charger is not applicable to a variety of technical fields since it is not easily manufactured in a variety of shapes. For example, one battery pack cannot be commonly used since the battery packs of portable devices such as a portable phone, a PDA, a PMP, a DMB terminal, an MP3 player, and a notebook computer have connectors installed in different places according to applications and manufacturers.

Moreover, if the battery pack moves while being charged, power transmission is not properly achieved and thus transmission efficiency degrades.

SUMMARY

Accordingly, there is a need for an improved non-contact charger and method for controlling the same that may obviate one or more of the above-mentioned problems or disadvantages. In particular, there is a need for an improved non-contact charging station with a planar spiral power transmission coil, and a method for controlling the same, in which a primary core of the non-contact charging station transmitting a power signal using an induced magnetic field toward a portable device is configured as a planar spiral power transmission coil to simplify its shape.

In the following description, certain aspects and embodiments will become evident. It should be understood that these aspects and embodiments are merely exemplary, and the invention, in its broadest sense, could be practiced without having one or more features of these aspects and embodiments.

One exemplary aspect of the present invention may provide a non-contact charging station with a planar spiral power transmission coil, and a method for controlling the same, in which the primary core can have a multi-layer structure due to its planar spiral power transmission coil structure to ensure charging of a plurality of power receiving apparatuses in one non-contact charging station. The diversity of this structure makes it possible to ensure an efficient charging operation, thereby stably and continuously charging the portable device, even if the portable device is displaced.

Another exemplary aspect of the present invention may provide a non-contact charging station with a planar spiral power transmission coil, and a method for controlling the same, which is controlled to operate so that power can be stably transmitted to the portable device by adjusting transmission power through a power transmission control algorithm even if the portable device is displaced from a position corresponding to one coil to a position corresponding to another coil (for example, even if the portable device is displaced from a coil on which the portable device was being charged).

Yet another exemplary aspect of the present invention may provide one non-contact power-receiving apparatus with a plurality of connectors, so that the non-contact power-receiving apparatus can be applied to various types of portable devices using one battery pack.

In still another exemplary aspect of the present invention, a non-contact charging station for generating an induced magnetic field toward a non-contact power-receiving apparatus for power charge and data transmission is provided.

In one exemplary aspect of the present invention, a non-contact power transmission station with a planar spiral power transmission coil may comprise: a transmission controller for transmitting power to a non-contact power-receiving apparatus and transmitting/receiving data; and a station part electrically connected with the transmission controller to generate the induced magnetic field and transmit power to the non-contact power-receiving apparatus, which is disposed on a top thereof. The station part may comprise a primary core where the induced magnetic field is generated; the primary core includes a core base, which has a central coil and two side coils and which is fastened to the station part; and the central coil and the two side coils selectively generate an induced magnetic field under control of the transmission controller.

A shielding section for shielding the induced magnetic field may be configured on a lower surface of the core base.

The shielding section may include a shielding panel, a shielding mesh and a metal thin film, which are sequentially adhered to the lower surface of the core base.

The two side coils may be disposed on the core base in contact with each other while the central coil is layered on the top of the two side coils.

The two side coils may also be disposed on the core base spaced apart from each other while the central coil is layered on the top of the two side coils.

The protruded core base may be configured between the two side coils which are spaced apart.

The two side coils may also be disposed on the core base to be partially overlapped while the central coil may be overlapped with the two side coils on the top of the overlapped region of the two side coils.

The central coil and the two side coils may be wound by any one spiral structure of a square-spiral structure, a circular-spiral structure, an elliptical-spiral structure and a polygonal-spiral structure. The non-contact power transmission station may further comprise: a pre-driver for generating an oscillation signal under control of the transmission controller; a resonant converter for generating alternating current (AC) power by switching operation power according to the oscillation signal; first to third switches, which are respectively disposed between two side coils, the central coil, and the resonant converter; a state controller for selectively supplying the AC power to the central coil and two side coils by selectively switching the first to third switches under control of the transmission controller; and a reception signal processor for receiving a signal transmitted from the non-contact power-receiving apparatus via the central coil or the two side coils and providing the signal to the transmission controller.

The transmission controller determines from which coil, of the central coil and the two side coils, the signal received in the reception signal processor is received, and controls the AC power to be supplied to the coil selected according to the determination result.

Some exemplary aspects of the present invention may provide a method for controlling a non-contact power transmission station with a planar spiral power transmission coil. The method may comprise: requesting a unique identification (ID) from a non-contact power-receiving apparatus via a plurality of coils provided on a primary core; receiving the unique ID transmitted from the non-contact power-receiving apparatus according to the request and processing the signal; determining, based on the signal process result, via which coil the unique ID is received; and supplying power to the coil receiving the unique ID to generate an induced magnetic field and supply power to the non-contact power-receiving apparatus.

The plurality of coils may be disposed to be partially overlapped.

The step of receiving the unique ID transmitted from the non-contact power-receiving apparatus according to the request and processing the signal, may include sensitivity in receiving the unique ID via each of the coils.

The coil generating the induced magnetic field may be a coil having the highest sensitivity in receiving the unique ID.

The coil without generation of the induced magnetic field among the coils may be shielded to prevent supply of the power.

In accordance with exemplary embodiments of the present invention as set forth above, the non-contact charging station is simple in shape since the primary core transmitting a power signal using an induced magnetic field toward a portable device is configured as a planar spiral power transmission coil. Thus, the non-contact charging station can be easily mounted on a non-contact charger, thereby achieving a remarkable effect of improved applicability.

The primary core may be configured as a multi-layer structure. This may ensure that a portable device is constantly and stably charged even if it is displaced or moved to any position.

In particular, power transmission may be improved by stably transmitting power through a power transmission control algorithm even if the non-contact power-receiving apparatus provided to the portable device is displaced due to shaking while being charged.

Moreover, the non-contact power-receiving apparatus may be applied to various types of portable devices using one battery pack since the terminal connector assembly of the non-contact power-receiving apparatus includes a plurality of connectors. The generality and compatibility of a product can be improved.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate various embodiments consistent with the invention and, together with the description, serve to explain the principles of the invention.

DESCRIPTION OF EMBODIMENTS

Figure 1:
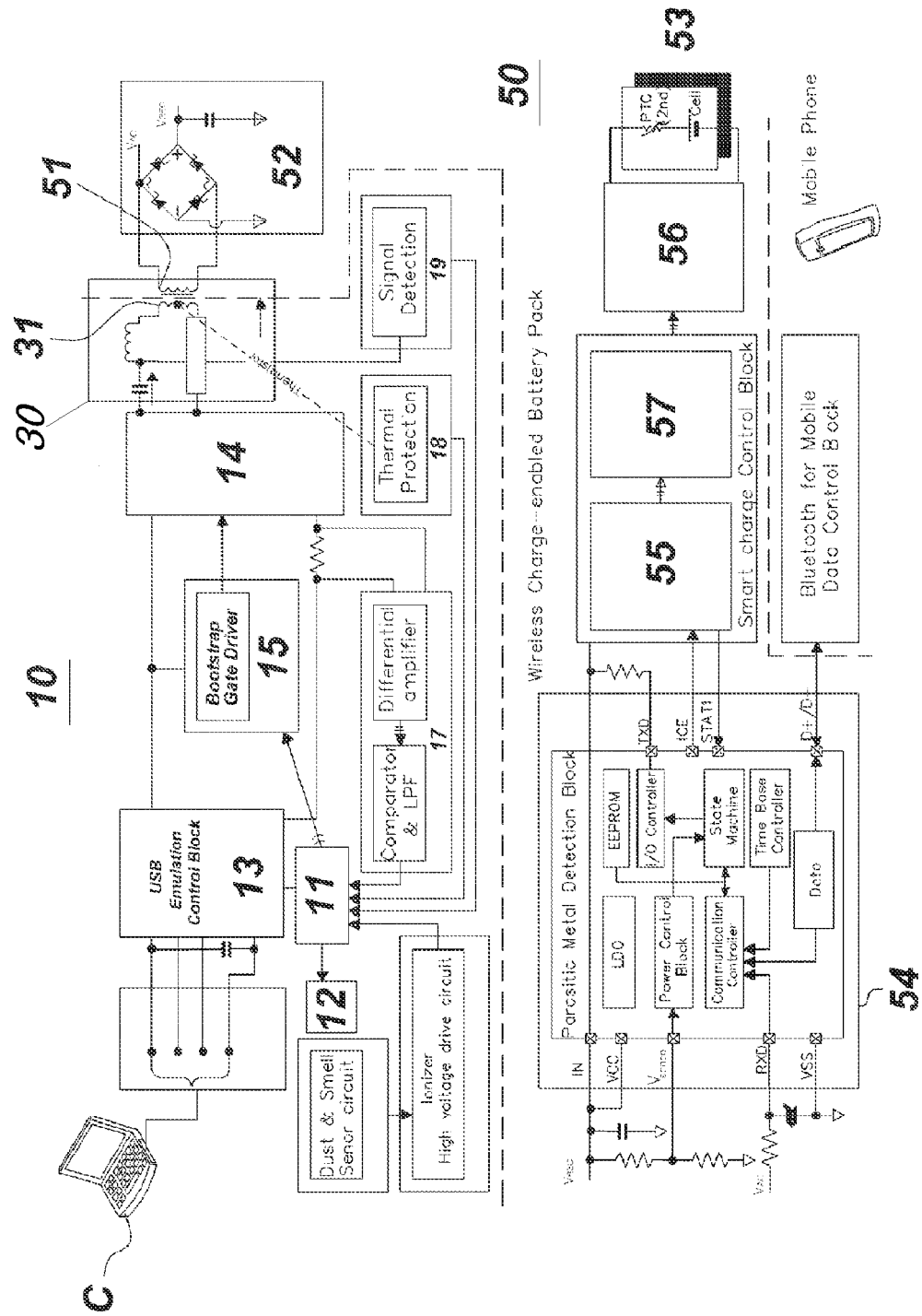
FIG. 1 is a block diagram illustrating a non-contact charging station and a non-contact power-receiving apparatus in accordance with one exemplary embodiment.

Reference will now be made in detail to the exemplary embodiments consistent with the present disclosure, examples of which are illustrated in the accompanying drawings. Wherever possible, the same reference characters will be used throughout the drawings to refer to the same or like parts.

Referring to FIG. 1, when a power signal occurs due to an induced magnetic field from a primary core 31 of a non-contact charging station 10 of the present invention, a secondary core 51 of a non-contact power-receiving apparatus charges a battery or cell 53 by receiving the power signal.

For this, the non-contact charging station 10 may include a transmission controller 11 and a station part 30. The transmission controller 11 transmits electric power and transmits and receives data. The station part 30 includes a primary core 31 electrically connected with the transmission controller 11 to generate an induced magnetic field. A power supply part 13, which receives electric power from an external power source, supplies the electric power to each member (e.g., electronic elements, etc.) of the non-contact charging station 10, and to the primary core 31 to generate an induced magnetic field therefrom. The power supply part 13 can be configured to perform data communication with an external device (e.g., a computer C in FIG. 1).

The non-contact charging station 10 may also include a resonant converter 14 supplying electric power from the power supply part 13 to the primary core part 31, a pre-driver 15 transmitting an oscillation signal to the resonant converter 14 under the control of the transmission controller 11, and the like. The pre-driver 15 supplies electric power from the power supply part 13 to the primary core part 31 by driving the resonant converter 14 in response to the oscillation signal transmitted from the transmission controller 11.

In addition, a station memory 12 stores processing and its results on the internal operation of the non-contact charging station 10 in accordance with the present invention.

The non-contact charging station 10 may also include a received signal processor 19 connected with the primary core 31. The received signal processor 19 processes a signal transmitted from the non-contact power-receiving apparatus 50 to transmit the processed signal to the transmission controller 11. The received signal processor 19 will be described in more detail later.

Furthermore, other exemplary embodiments (not shown), the non-contact charging station 10 can be additionally provided with a variety of means for additional functions, including a power on/off switch to start/stop operation, an input panel for signal input, a non-contact charging plate acting as the station part 30, and a display unit such as an Liquid Crystal Panel (LCD) and Light Emitting Diodes (LEDs) displaying a charged state of the non-contact power-receiving apparatus 50.

Accordingly, when a portable device such as a cellular phone, a Personal Digital Assistant (PDA), a Portable Media Player (PMP), a Digital Multimedia Broadcasting (DMB) terminal, an MPEG-1 audio layer-3 (MP3) player and a notebook computer, or the non-contact power-receiving apparatus 50, such as a detachable battery pack mounted on the portable device, is placed on the charging plate, e.g., the station part 30 of the non-contact charging station 10, the received signal processor 19 processes signals transmitted from the non-contact power-receiving apparatus 50 and transmits the processed signals to the transmission controller 11, and the transmission controller performs a charging operation so that the non-contact power-receiving apparatus 50 can be charged.

External electric power supplied to the power supply part 13 of the non-contact charging station 10 may be supplied via a Universal Serial Bus (USB) port, an Alternating Current (AC) adaptor, a cigar jack, and so on. In the case of supplying electric power via the USB port, data communication with a computer can, of course, be established.

The non-contact charging station 10 may also include a temperature sensor 18 detecting the internal temperature of the non-contact charging station 10. The charging operation can be selectively stopped when the temperature detected by the temperature sensor 18 rises (e.g., the temperature of the station part locally rises), and the entire operation of the system can be stopped when the temperature detected by the temperature sensor 18 further rises (e.g., the entire non-contact charging station is over-heated).

In addition, the non-contact charging station may also include a current sensor 17 such as a current-detecting element connected to the power supply part 13, the pre-driver 15, the resonant converter 14, and the received signal processor 19 to monitor a flow of current in and between components.

When the current sensor 17 detects an excessive current or voltage from any one of the components, the charging operation of the non-contact charging station 10 or the operation of the system can be stopped.

A more detailed description will be given below of the non-contact charging station 10 and the non-contact power-receiving apparatus 50 as configured above.

An induced magnetic field occurring from the primary core 31 in the station part 30 of the non-contact charging station 10 causes an induced current in the secondary core 51 of the non-contact power-receiving apparatus 50. The induced current also causes induced electric power to charge a battery cell 53.

In this case, a battery pack controller 54 detects the intensity of the induced electric power and transmits a detection signal to the non-contact charging station 10, which in turn controls the intensity of the induced magnetic field generated from the primary core 31 based on the received detection signal (e.g., data).

As a result, the level of the electric power can be controlled so as to stably charge a portable device.

In addition, the non-contact power-receiving apparatus 50 can be implemented as a battery pack or semi-battery pack, which may be provided as a separate unit from the portable device so as to be attached to and detached from the portable device. Alternatively, the non-contact power-receiving apparatus 50 can be integrally configured so as to be mounted inside the portable device according to the intention of a person of ordinary skill in the art.

The non-contact power-receiving apparatus 50 for receiving the induced electric power as above may include a rectifier block 52 connected with the secondary core 51 to rectify an induced current and a battery pack controller 54 processing data transmitted/received via the secondary core 51. The data transmitted/received via the second core 51 can be detected by the current sensor 17 of the non-contact charging station 10.

In addition, the non-contact power-receiving apparatus 50 may also include a charge circuit block 55 and a charge monitor circuit block 56. The charge circuit block 55 allows electric power supplied from the rectifier block 52 to be charged to the battery cell 53 under the control of the battery pack controller 54. The charge monitor circuit block 56 monitors the level of charge of the battery cell 53 and transmits a signal notifying that the battery cell 53 is fully charged or is discharged to the battery pack controller 54.

The battery pack controller 54 controls components of the non-contact power-receiving apparatus 50 such as the rectifier block 52, the charge circuit block 55, the charge monitor circuit block 56, and a gauge block 57, and transmits data such as charge state information to the non-contact charging station 10. The charge monitor circuit block 56 is fitted between the charge circuit block 55 and the battery cell 53. The charge monitor circuit block 56 detects a current supplied to the battery cell 53, transmits charge state information of the battery cell 53 to the battery pack controller 54, and detects an excessive voltage, an insufficient voltage, an excessive current, a short-circuit, and the like from the battery pack.

In addition, the battery pack controller 54 of the non-contact power-receiving apparatus 50 determines whether or not the induced electric power is stably received by monitoring the induced electric power received through the secondary core 51 and measuring the voltage of the induced electric power. A variety of reference voltages of the received induced electric power can be selected based on the specifications of the non-contact power-receiving apparatus 50 according to the intention of a person of ordinary skill in the art. For example, the reference voltage can be set on the order of 2 to 20 V. The reference voltage can also be set about 5 V in the case it is applied to a typical electronic device.

The charge monitor circuit block 56 determines whether the induced electric power is a low or high voltage by comparing the voltage of the received induced electric power to a preset reference voltage. For example, when the reference voltage is 5 V, if the voltage of the induced electric power is lower by about 0.5 to 1.5 V than the reference voltage 5 V, the charge monitor circuit block 56 determines the induced electric power as a low voltage. If the voltage of the induced electric power is higher by about 0.5 to 1.5 V than the reference voltage 5 V, the charge monitor circuit block 56 determines the induced electric power as a high voltage.

When the voltage of the induced electric power is determined to be a high or low voltage, the battery pack controller 54 transmits information regarding the degree of voltage calibration together with the unique Identification (ID) of the non-contact power-receiving apparatus 50 to the non-contact charging station 10. Then, the non-contact charging station 10 controls the level of electric power induced from the primary core 31 based on the received voltage calibration information.

Figure 2:
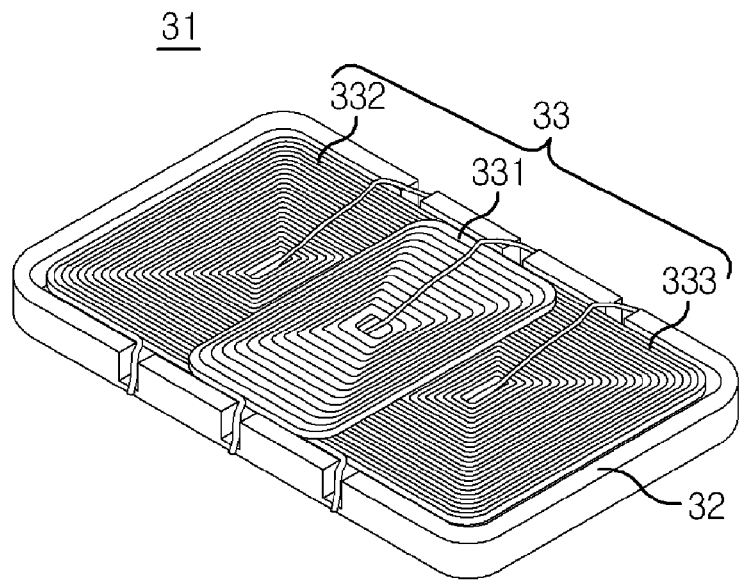
FIG. 2 is a cross-sectional view showing a primary core of a non-contact power charging station in accordance with one exemplary embodiment.
Figure 3:
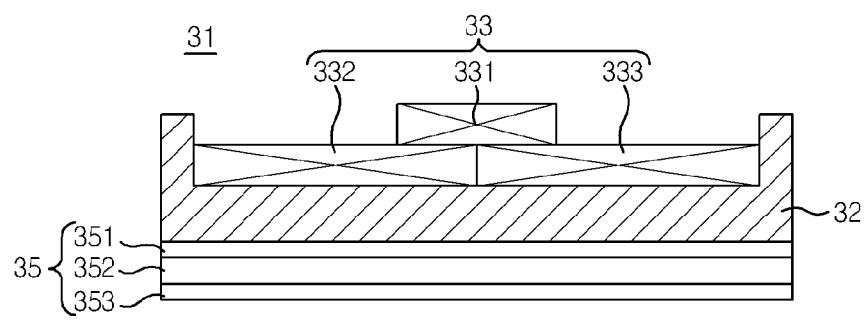
FIG. 3 is a cross-sectional view showing the primary core of the non-contact power charging station in accordance with another exemplary embodiment.

The primary core 31 of the non-contact power charging station 10 may include a coil 33 on a core base 32 as shown in FIGS. 2 and 3, and may be configured such that the core base 32 is fastened to the station part 30.

Figure 6:
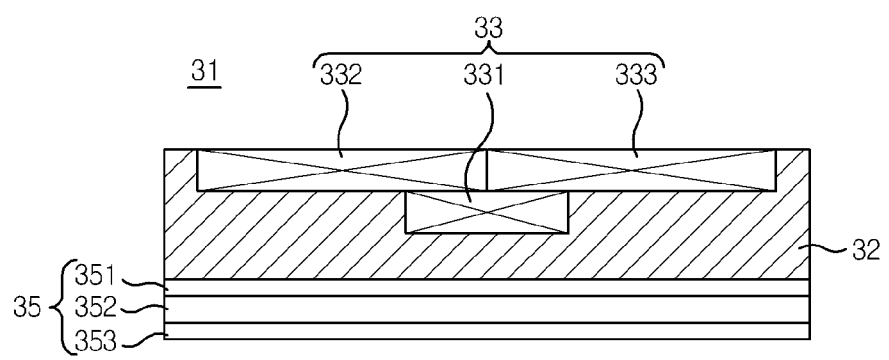
FIG. 6 is a cross-sectional view showing the primary core of a non-contact power charging station in accordance with still yet another exemplary embodiment.

The coil 33 may include a central coil 331 and two side coils 332 and 333. For example, as shown in FIG. 3, the two side coils 332 and 333 may be disposed on the core base 32 in contact with each other and the central coil 331 may be layered on the top. The central coil 333 may also be disposed beneath the two side coils 332 and 333 as shown in FIG. 6.

Figure 4:
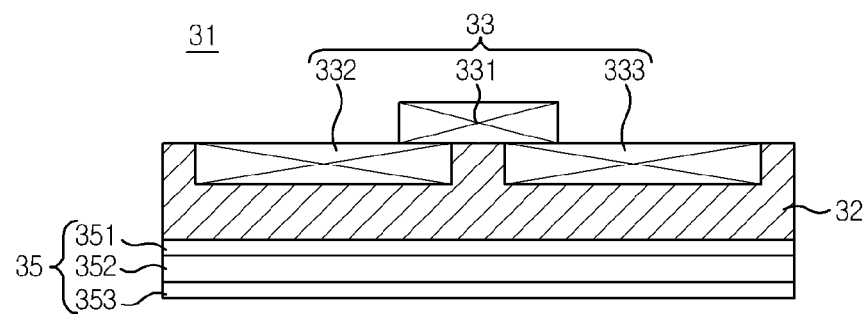
FIGS. 4 and 5 are cross-sectional views showing the primary core of the non-contact power charging station in accordance with still another exemplary embodiment.

As shown in FIG. 4, the two side coils 332 and 333 may be disposed on the core base 32 to be spaced apart from each other at a predetermined distance and the central coil 331 may be layered on the top of or beneath the two side coils 332 and 333. When the two side coils 332 and 333 are disposed to be spaced apart from each other, the core base 32 may be configured to protrude between the two side coils 332 and 333.

Figure 5:
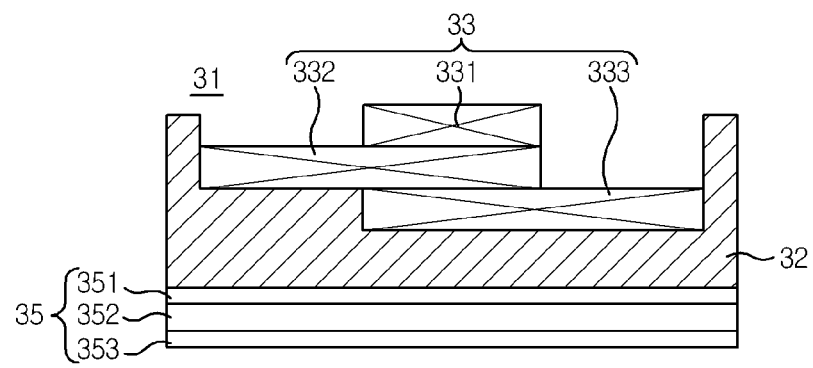

As shown in FIG. 5, a part of the side coil 332 may be configured to be layered on the top of a part of the side coil 333 and the central coil 331 may be configured to be layered on the top of the side coil 332. When the parts of the side coil 333 and the side coil 332 are disposed to be layered, a raised spot 34 may be provided on the core base 32 to house the side coils 332 and 333.

The central coil 331 and the side coils 332 and 333 may be disposed according to diverse structures as well as the structure exemplified above. The structure where one central coil 331 is layered on the top of the two side coils 332 and 333 is provided only as an example. A layered structure where one central coil 331 is disposed on the bottom of one side coil 332 and the other side coil 333 is disposed on the top of the side coil 332 may also be employed.

Furthermore, although in the drawings, the central coil 331 is illustrated as being smaller in size than the side coils 332 and 333, it should be apparent that the central coil 331 and the side coils 332 and 333 may be configured to be the same size. Further, the central coil 331 may be configured to be larger in size than the side coils 332 and 333.

Silk covered wire (USTC wire), Urethane Enamelled Wire (UEW), Polyurethane Enamelled Wire (PEW), Triple Insulated Wire (TIW) or Litz wire may be used in the central coil 331 and the side coils 332 and 333.

Figure 7:
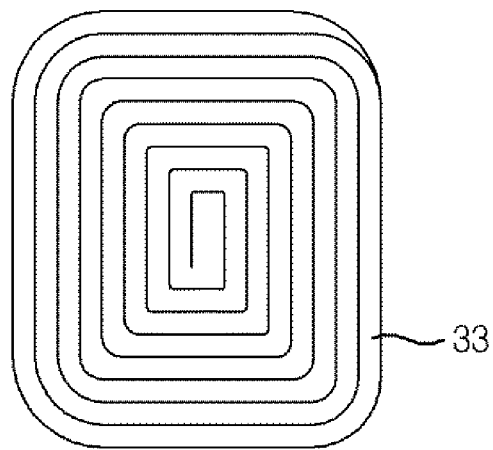
FIGS. 7 and 8 are plan views showing a structure of coils used in the primary core of the non-contact power charging station in accordance with one exemplary embodiment.
Figure 8:
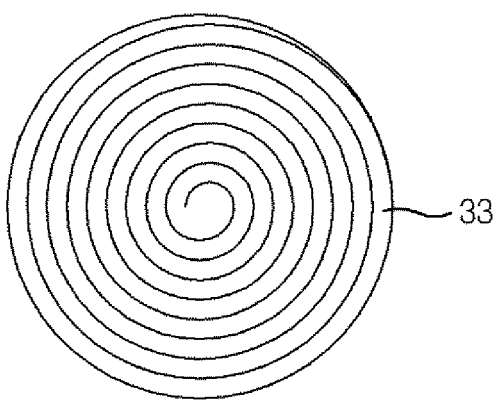

The coil 33 may be wound in diverse structures including a square structure as shown in FIG. 7, a circular structure shown in FIG. 8, an elliptical structure and a polygonal structure.

The primary core 31 may also include a shielding section 35 under the core base 32, and the shielding section 35 may include a shielding panel 351, a shielding mesh 352, and a metal thin film 353.

The shielding panel 351 may comprise 55 to 75 parts by weight of sendust and 25 to 55 parts by weight of polyurethane. Sendust is a high magnetic permeable alloy containing aluminum, silicon, iron, etc. The shield panel may be formed by combining sendust, which has excellent shielding performance, with polyurethane. If the content of sendust is less than 55 parts by weight, shielding performance may degrade. In contrast, if the content of sendust exceeds 75 parts by weight, the performance may not improve proportionately to the amount of sendust used.

Since the shielding panel 351 may be comprised as a sendust-containing panel, it can efficiently shield a magnetic field radiating downward, thereby ensuring the performance of an electronic device and the like mounted on the non-contact charging station 10.

In addition, the shielding mesh 352 may reduce an eddy current associated with an induced electromotive force generated by an induced magnetic field. The shielding mesh 352 has a mesh-like polyester body to which an eddy current-reducing composition is coated. The eddy current-reducing composition may contain 55 to 65 parts by weight of nickel and 35 to 45 parts by weight of zinc. The shielding mesh may be implemented with a metal net of about 100 to 200 mesh, and more preferably, 135 mesh.

As a result, an eddy current that may be generated from the non-contact charging station 10 is cleared by the shielding mesh 352 which is coated with an eddy current reducing composition.

In addition, the metal thin film 353 may be implemented with an aluminum thin film. The metal thin film 353 is placed in the bottom of the shielding section 35 (e.g., HPES: Hanrim Postech Electro-magnetic Shield) to ultimately shield a magnetic field, thereby preventing the magnetic field from influencing the circuit.

The non-contact power charging station 10 of the present invention may continuously supply power to the non-contact power-receiving apparatus 50 since it is possible to communicate with the secondary core 51 of the non-contact power-receiving apparatus 50 by selectivity using the central coil 331 and the side coils 332 and 333 according to a moved location, for example, when the non-contact power-receiving apparatus 50 moves to the top of the central coil 331 and the side coil 333 due to vibration or sudden movement of the non-contact power-receiving apparatus 50 from a state where the non-contact power-receiving apparatus 50 was located on the top of the side coil 332, or according to an arbitrary location that the non-contact power-receiving apparatus 50 is placed on the non-contact power charging station 10.

For example, power is supplied via the side coil 332 in the case that the secondary core 51 of the non-contact power-receiving apparatus 50 is located on the top of the side coil 332 as shown in Table 1. When the secondary core 51 of the non-contact power-receiving apparatus 50 is located on the top of the central coil 331, power is supplied via the central coil 331. When the secondary core 51 of the non-contact power-receiving apparatus 50 is located on the top of the side coil 333, power is supplied via the side coil 333. Also, when the secondary core 51 of the non-contact power-receiving apparatus 50 is located on the top of the region that the side coil 332 and the central coil 331 overlap, power is supplied via the side coil 332 and the central coil 331, where the side coil 332 and the central coil 331 may each supply one-half power. When the secondary core 51 of the non-contact power-receiving apparatus 50 is located on the top of the region that the central coil 331 and the side coil 333 overlap, power is supplied via the side coil 333 and the central coil 331, where the side coil 333 and the central coil 331 may each supply one-half power.

TABLE 1

| Location of Secondary core 51 | Coil transmitting power | | | Note |
| --- | --- | --- | --- | --- |
| | Side coil (332) | Central (331) | Side coil (333) | |
| Top of Side coil (332) | o | x | x | |
| Top of Central (331) | x | o | x | |
| Top of Side coil (333) | x | x | o | |
| Top of Side coil (332) and Central (331) | o | o | x | Side coil (332) and Central (331) transmit power half and half |
| Top of Side coil (333) and Central (331) | x | o | o | Side coil (333) and Central (331) transmit power half and half |

Figure 9:
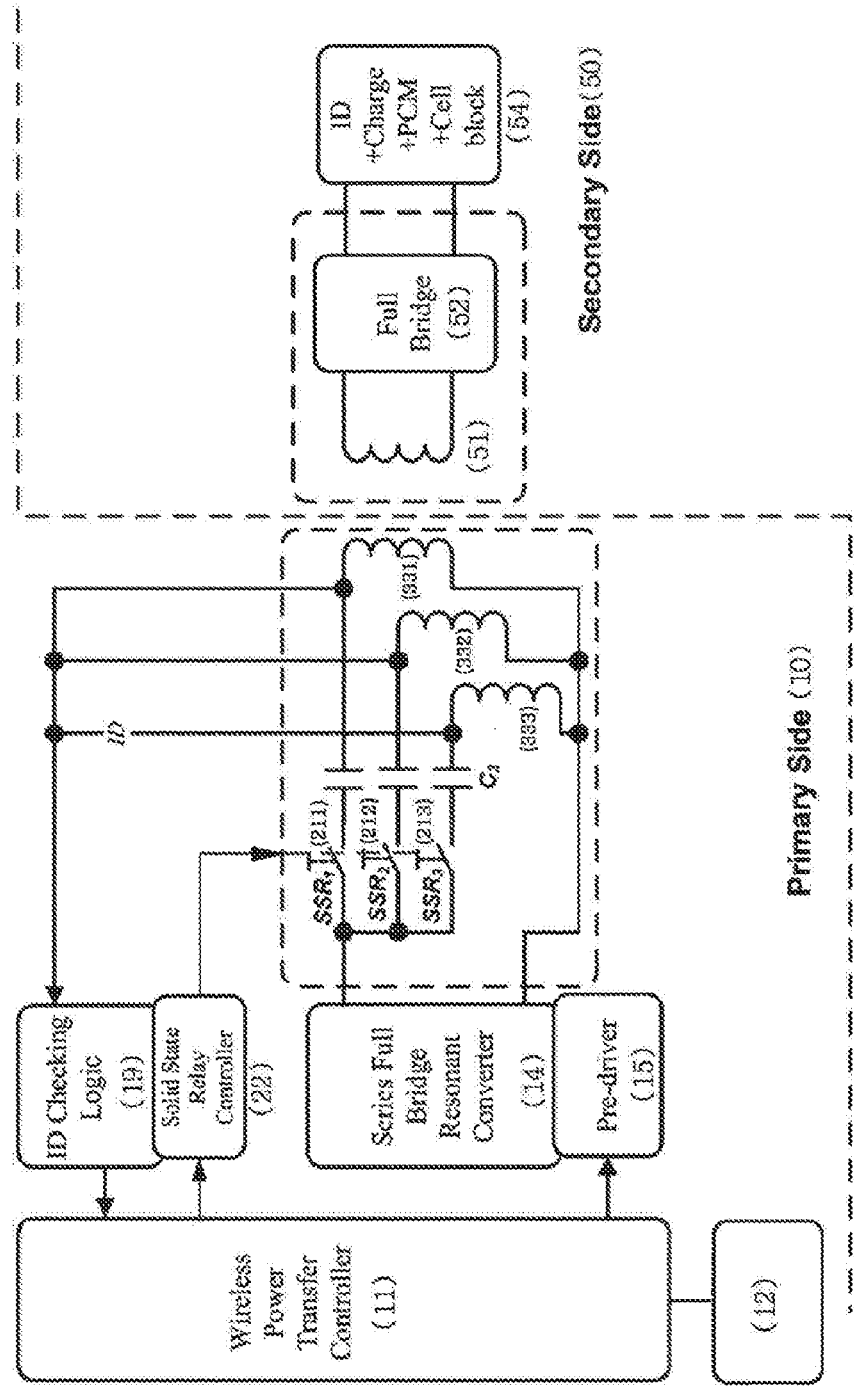
FIG. 9 is a block diagram illustrating a circuit of the non-contact charging station and the non-contact power-receiving apparatus, for controlling the primary core.

In addition, as shown in FIG. 9, the received signal processor 19 of the non-contact charging station 10 continuously transmits/receives signals to/from the non-contact power-receiving apparatus 50 while maintaining connection with the central coil 331, the first side coil 332, and the second side coil 333 of the primary core 31.

Additionally, a plurality of separate switches are provided in order to separately control power transmission via the central coil 331, the first side coil 332, and the second side coil 333. The switches include a first switch 211 ('SSR 1' in FIG. 9) connected between the resonant converter 14 and the central coil 331, a second switch 212 ('SSR 2' in FIG. 9) connected between the resonant converter 14 and the first side coil 332, and a third switch 213 ('SSR 3' in FIG. 9) connected between the resonant converter 14 and the second side coil 333.

Also provided is a solid state relay controller 22 that allows the first through third switches 211 to 213 to be switched under the control of the transmission controller 11.

Accordingly, the transmission controller 11 detects the non-contact power-receiving apparatus 50 and transmits induced electric power to the non-contact power-receiving apparatus 50 via the central coil 331, the first side coil 332 and the second side coil 333. When the received signal processor 19 (e.g., an ID checking logic) receives a signal detected from the central coil 331, the first or second side coils 332 or 333 and transmits the detection signal to the transmission controller 11, the transmission controller 11 (e.g., a wireless power transfer controller) determines which one of the signals transmitted from the central coil 331, the first side coil 332, and the second side coil 333 is most stable. Afterwards, the transmission controller 11 controls a switch connected to a coil that stably transmits/receives the signal so that induced electric power can be transmitted via the corresponding coil. Then, the corresponding coil generates an induced magnetic field for transmitting a power signal via the pre-driver 15 and the resonant converter 14 (e.g., a series full bridge resonant converter).

Below, a method for controlling the non-contact charging station 10 of the present invention will be described with reference to FIGS. 9 through 12.

Firstly, the primary core 31 transmits a request signal for a unique ID to the non-contact power-receiving apparatus 50 under the control of the transmission controller 11 (standby step S 11). In standby step S 11, the central coil 331, the first side coil 332, and the second side coil 333 sequentially transmit unique ID request signals via the pre-driver 15, the resonant converter 14 and the solid state relay controller 22. The unique ID may include a unique ID of each coil of the primary core 31, and a unique ID of the non-contact power-receiving apparatus 50.

Also, in standby step S 11, the non-contact power-receiving apparatus 50 detects the sensitivity of a signal (e.g., the intensity of an induced current and voltage) transmitted from the non-contact charging station 10, selects a coil providing the best sensitivity, and transmits a response signal including the unique ID of the selected coil, the unique ID of the non-contact power-receiving apparatus 50, and information about the sensitivity of the coil.

The response signal transmitted from the non-contact power-receiving apparatus 50 is transferred to the received signal processor 19 of the non-contact charging station 10.

When standby step S 11 is completed, the received signal processor 19 extracts data-specific information by analyzing the response signal transmitted from the non-contact power-receiving apparatus 50 (ID signal detecting step S 12). The extracted information includes the unique ID of the coil, the sensitivity of the coil, and the unique ID of the non-contact power-receiving apparatus 50.

When the ID signal detection step S 12 is completed, information extracted from the received signal processor 19 is transferred to the transmission controller 11, which in turn determines which one of the first side coil 332, the second side coil 333, and the central coil 331 matches the unique ID by analyzing the transferred information (locating step S 13).

When the coil providing the best sensitivity is selected as described above, the controller 11 transmits a switching signal for turning on a corresponding switch (e.g., a switch 211 when the first side coil is selected) to the solid state relay controller 22 (switch control signal transmitting step S 14).

When the corresponding switch is turned on by the switch control signal transmitting step S 14, the pre-driver 15 transmits an oscillation signal to the resonant converter 14 under the control of the transmission controller 11, and the resonant converter 14 supplies electric power to the corresponding coil via the turned-on switch, so that the coil generates an induced magnetic field to charge the battery cell 53 of the non-contact power-receiving apparatus 50 (non-contact power transmitting step S 15). In this case, the other switches corresponding to the other coils not selected can be controlled to be turned off in order to prevent waste of power.

In addition, the non-contact charging station 10 can include a display unit (not shown) implemented with a display device (e.g., an LCD or LEDs) for displaying a unique ID and charging state so that the non-contact power-receiving apparatus 50, which is a dedicated battery pack capable of being wirelessly charged, can be identified. A step of outputting information (not shown) using that component can also be included.

A radio communication module (e.g., a Bluetooth, Zigbee, WiFi, or WiBro module) capable of synchronizing with a radio data communication function embedded in the portable device can also be provided. In addition, there are additional steps of detecting whether or not other metallic bodies other than the portable device to be charged is placed on the station part and stopping the charging operation (e.g., an impurity detecting function), and protecting against overload and excessive temperature.

Figure 10:
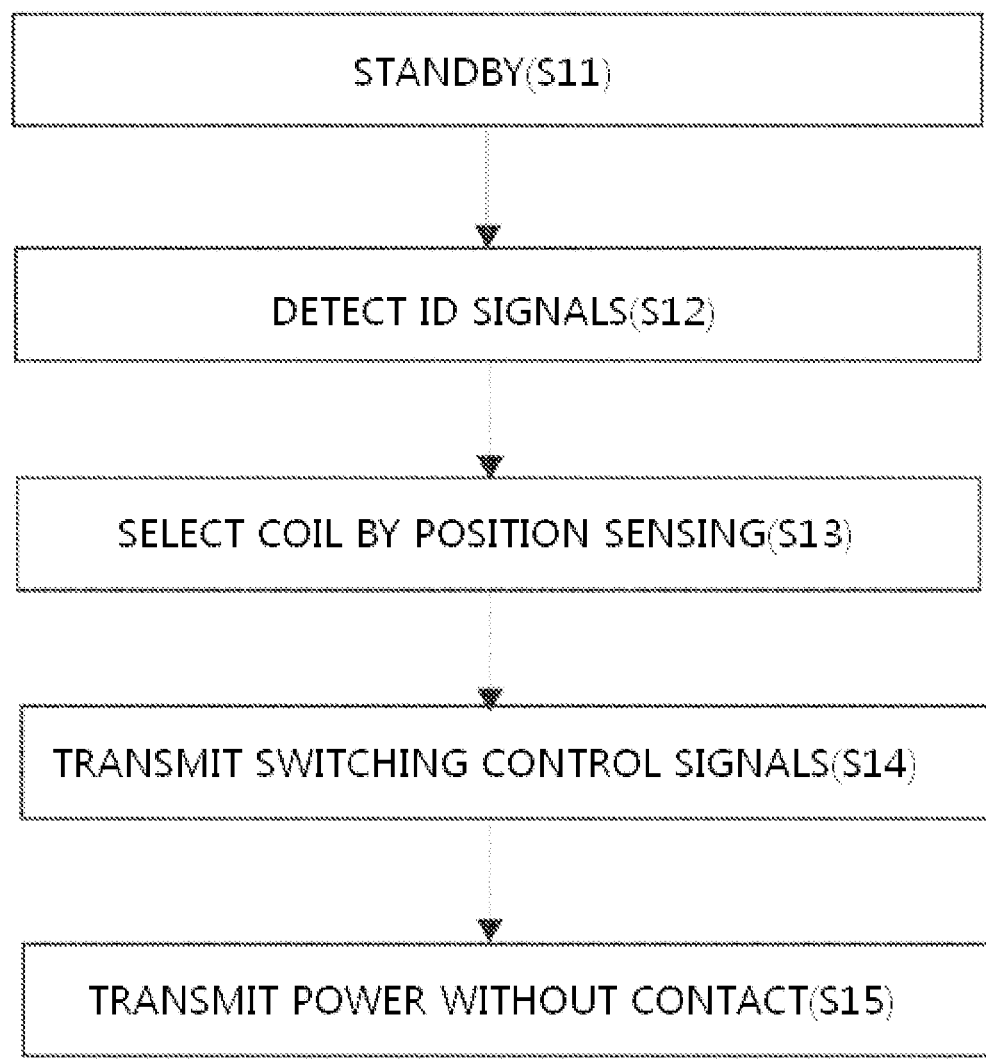
FIG. 10 is a flowchart illustrating an exemplary method for controlling the non-contact charging station and the non-contact power-receiving apparatus having a planar spiral power transmission coil in accordance with the present invention.
Figure 11:
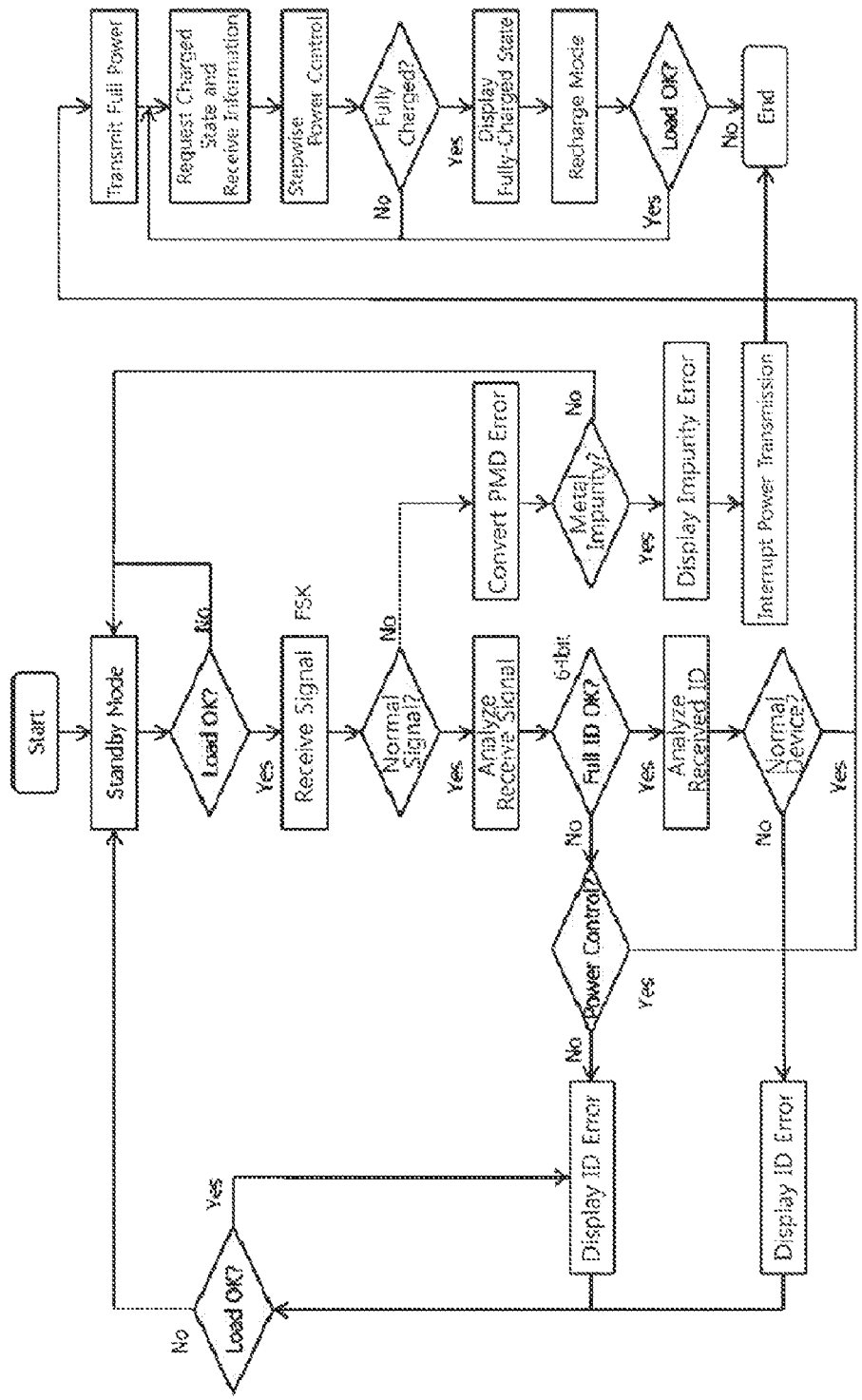
FIG. 11 is a flowchart illustrating an exemplary process control over the non-contact charging station having a planar spiral power transmission coil in accordance with the present invention.
Figure 12:
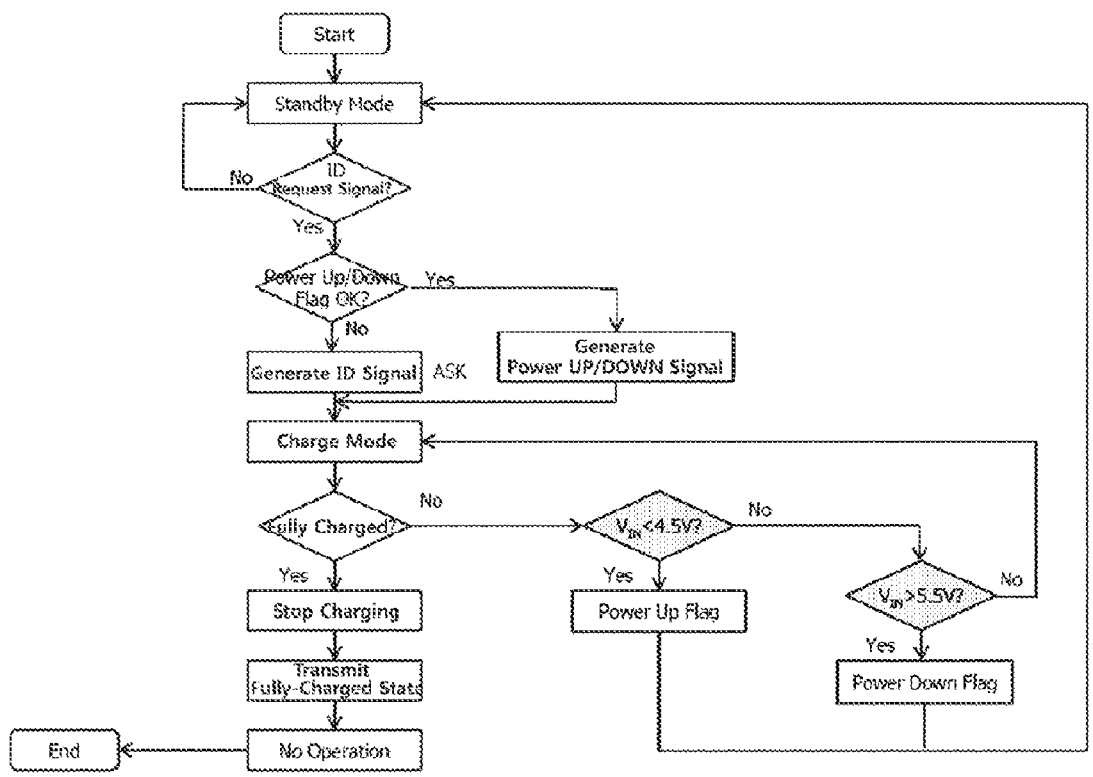
FIG. 12 is a flowchart illustrating an exemplary process control over the non-contact power-receiving apparatus having a planar spiral power transmission coil in accordance with the present invention.

FIG. 11 is a flowchart of the non-contact charging station 10 in the process of FIG. 10, and FIG. 12 is a flowchart of the non-contact power-receiving apparatus 50 in the process of FIG. 10.

In the meantime, the coils of the station part 30 of the non-contact charging station 10, in accordance with an exemplary embodiment of the present invention, are implemented with a planar spiral power transmission coil, using a USTC wire, an UEW (Urethane Enamelled Wire), a PEW (Polyurethane Enamelled Wire), a TIW (Triple Insulated Wire), a Litz-type coil, using bond wires. Therefore, the coil, in accordance with an exemplary embodiment of the present invention, has superior characteristics and improved functions over the existing coils and can be easily used and manufactured.

Especially, when only one planar spiral power transmission coil as described above is provided, the coil can be designed with a size 45 to 55$\phi$ in order to prevent degradation of impurity-detecting ability and other power transmission efficiency.

Furthermore, when the battery pack moves in a wider range than that of the coil as described above, it is difficult to stably transmit electric power using one coil. If the coil size is enlarged to resolve this difficulty, a magnetic field may be concentrated to the central portion, so that the magnetic field has excessively-high intensity in the central portion but a low intensity on the edges. Since this forms a parabolic profile, a transmitted voltage may be unbalanced.

Accordingly, when the single coil is provided, the charging plate of the station part 30 is reduced in size so that the non-contact power-receiving apparatus 50 does not move. In contrast, when the station part 30 is enlarged to charge a greater size of the non-contact power-receiving apparatus 50 or a plurality of the non-contact power-receiving apparatuses 50, a plurality of the planar spiral power transmission coils are provided. In this case, the plurality of coils can be implemented with a plurality of layers as shown in FIGS. 3, 4, 5 and 6, so as to overlap each other on the plane. Consequently, stable power transmission can be constantly realized even if the non-contact power-receiving apparatus 50 moves and is thus displaced.

As shown in FIG. 9, the received signal processor 19 of the non-contact charging station 10 has the function of extracting an Inductor-Capacitor (LC) resonant signal by employing a filtering technique in order to extract a data signal with a unique ID transmitted from the non-contact power-receiving apparatus 50. In addition, the transmission controller 11 controls a pulse signal to be generated for a predetermined time, and has an ID scanning function that discerns a unique ID signal received from the secondary side non-contact power-receiving apparatus 50. The transmission controller 11 also generates a signal for controlling the sequence of a four-phase switch of a serial resonant converter. Then, the resonant converter 14 is switched via the pre-driver 15.

Accordingly, the solid state relay controller 22 performs switching so that an induced magnetic field is generated from one of the three planar spiral coils (e.g., the planar spiral power transmission coils) of the primary core 31.

A voltage is induced on the secondary core 51 and the rectifier block 52 of the non-contact power-receiving apparatus 50 by the induced magnetic field as described above, and is then rectified through the rectifier circuit. The battery pack controller 54 of the non-contact power-receiving apparatus 50 transmits a unique ID data signal to the primary side, performs a control switching function of switching on/off a charging IC in order to start a charging mode, transmits a state value, which is fed back when fully charged, to the primary side, controls the charge circuit block 55 for charging the battery cell, and controls the charge monitor circuit block 56 to receive detection data of the battery cell 53 including an excessive voltage, an excessive current, a low residue voltage, and the like.

In the non-contact charging station 10 of the present invention as described above, a description will be given of a case where the primary core 31 is configured as a multi-layer structure. The primary core 31 includes the central coil 331, the first side coil 332, and the second side coil 333. When the secondary core 51 is located on any part of the primary core 31, it is located within the area of any one of the three planar winding coils including the first side coil 332, the second side coil 333, and the central coil 331, which are planar spiral power transmission coils.

Thus, even if the secondary core 51 is positioned on any part of the primary core 31, its location on the primary core 31 can be detected and thereby only a corresponding coil can be turned on to charge the non-contact power-receiving apparatus 50.

In other words, only the first side coil 332 is turned on under control and the second side coil 333 and the central coil 331 are turned off when the secondary core 51 is located on the first side coil 332.

When the secondary core 51 is displaced from the first side coil 332 onto the second side coil 333, the operation of the first side coil 332 is turned off but the second side coil 333 is turned on, so that the charging operation on the non-contact power-receiving apparatus 50 can proceed without interruption.

When the voltage measured from the rectifier does not exceed a predetermined value (e.g., 4.5 V), the non-contact power-receiving apparatus 50, which is being charged, transmits a signal regarding the power compensation to the non-contact charging station 10 as shown in FIG. 11. The non-contact charging station 10 receives the signal regarding the power compensation from the non-contact power-receiving apparatus 50, and transmits a power signal, the transmission power of which is being compensated, to the non-contact power-receiving apparatus 50 as shown in FIG. 11.

According to a control algorithm shown in FIGS. 11 and 12, a voltage induced on the secondary side non-contact power-receiving apparatus 50 is controlled in the range from 4.5 to 5.5 V so that the non-contact power-receiving apparatus 50 can be stably charged.

Meanwhile, the coils of the primary core 31 and the secondary core 51 are prepared by winding a Litz-type wire covered with insulation after twisting dozens of strands of enameled wire or polyurethane wire made with copper material having a thickness of 0.1 mm. While the coil 33 made of copper is illustrated as having a circular cross section, its cross-sectional shape can be changed into a square. The entire shape of the unit coil on the plane can be a circle, an ellipse, or a polygon such as a square.

Below, with reference to Table 2 below, a description will be given of the characteristics of the above-described unit coil according to the size:

TABLE 2

Power Consumption of Primary Core of Non-Contact Charging Station according to Size

| Classification | Case 1 | Case 2 | Case 3 |
| --- | --- | --- | --- |
| Size of primary core | 45Φ | 55Φ | 65Φ |
| DC voltage induced on secondary rectifier with no load | 7 V | 10 V | 14 V |
| DC voltage induced on secondary rectifier with load (@2.5 W) | 5 V | 6 V | 7 V |
| Voltage drop difference ($V_{drop}$) (= a − b) | 0.5 (5 − 4.5) | 0.15 (6 − 4.5) | 2.5 (7 − 4.5) |
| Power consumption (W) (= load voltage * Voltage drop difference) | 0.25 (0.5 * 0.5) | 0.75 (0.5 * 0.75) | 1.25 (0.5 * 2.5) |

As reported in Table 2 above, secondary rectifier voltages (@2.5 W), namely, voltages obtained by measuring a rectifier in the secondary side non-contact power-receiving apparatus 50 were obtained by measuring loads at a load current 500 mA and a load voltage 5V, and voltage drop differences (V drop) were when battery cells were charged with 4.5 V using voltages generated from the rectifiers via the secondary core 51 of the non-contact power-receiving apparatus 50.

Referring to the measurement results reported in Table 2 above, with no load, the voltage induced on the rectifier increases as the size of the primary core 31 of the non-contact charging station 10 increases. With load, the voltage induced on the rectifier increases as the primary core increases in size, the voltage drop difference increases, and thus consumes more power.

Therefore, when the battery pack is the non-contact power-receiving apparatus 50 being applied to a typical portable phone, the primary core 31 of the non-contact charging station 10 can have a rectangular structure with one core 50×45 mm², whereas the secondary core 51 of the non-contact power-receiving apparatus 50 can have a rectangular structure with a smaller size.

Now, with reference to Table 3 below, a description will be given of the characteristics of the above-described unit coil according to the shape:

TABLE 3

Power Consumption of Primary Core of Non-Contact Charging Station according to Shape

| Item | Circular planar winding | Rectangular planar winding |
| --- | --- | --- |
| Mobility according to position of secondary load | 5 V (Center) 3.5 V (Edge) | 4.8 V (Center) 4.5 V or more (Edge) |
| Energy efficiency (@2.5 W load) | 60% | 59% |
| Performance estimation | Efficiency is slightly high, with limitations due to displacement of battery pack | Efficiency is similar, with less limitations due to displacement of battery pack |

Table 3 above illustrates the characteristics based on the position of the secondary core displaced according to the shape of the primary core. When the primary core has a circular shape, the power transmission characteristic in the central portion of the core is good but degrades when the secondary core is positioned on the edge. In contrast, when the primary core has a rectangular shape, power transmission efficiency does not degrade even if the secondary core is displaced to the edge. It can be appreciated that the rectangular primary core does not have strict positional limitations.

Figure 13:
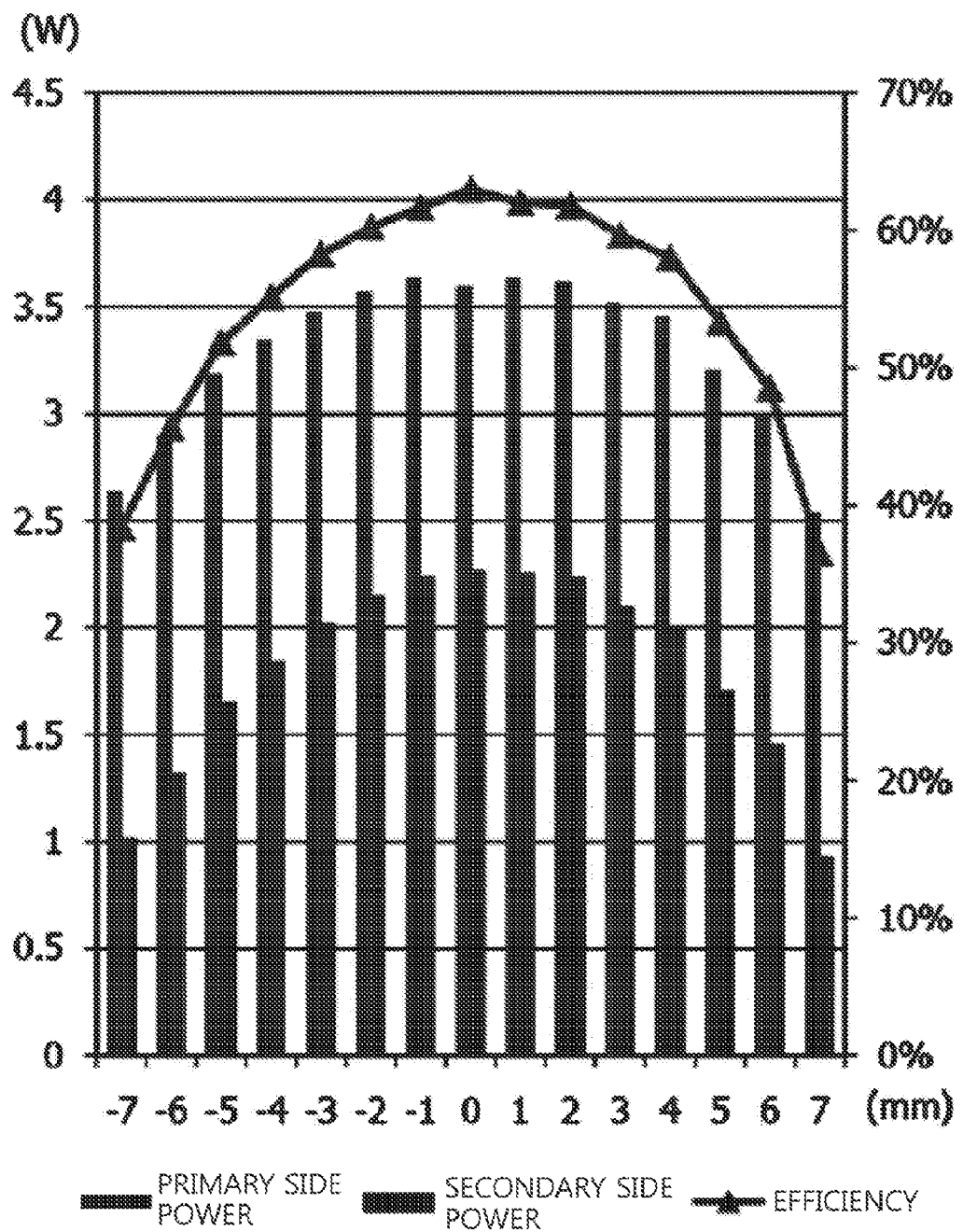
FIG. 13 is a graph illustrating amounts of induced current on the primary core and the secondary core and resultant efficiency before voltage calibration.
Figure 14:
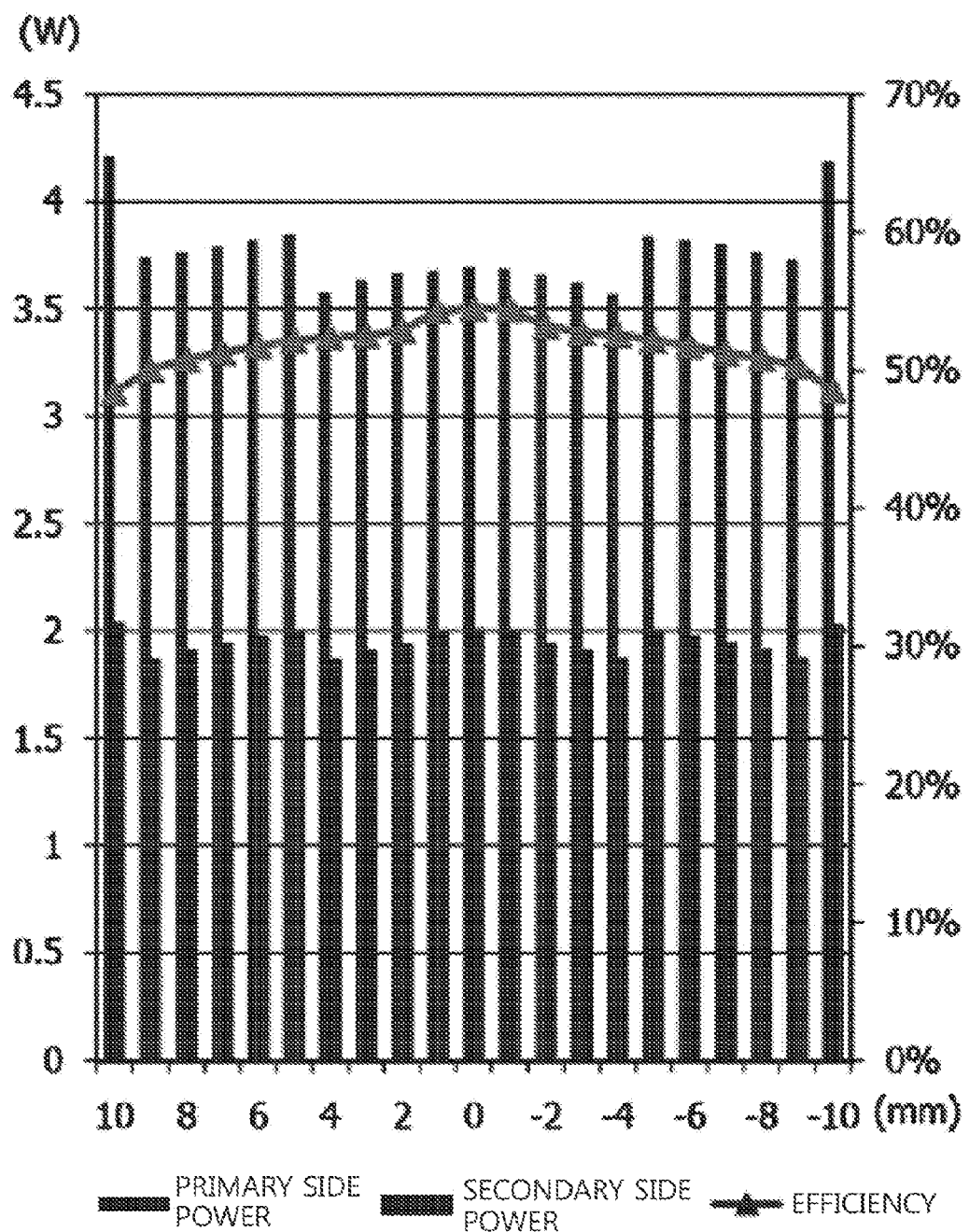
FIG. 14 is a graph illustrating amounts of induced current on the primary core and the secondary core and resultant efficiency after voltage calibration.

For reference, FIG. 13 is a graph before the voltage of induced electric power is calibrated, and FIG. 14 is a graph after the voltage of induced electric power is calibrated. FIG. 12 shows that power can be stably supplied by applying algorithms shown in FIGS. 11 and 12.

Figure 17:
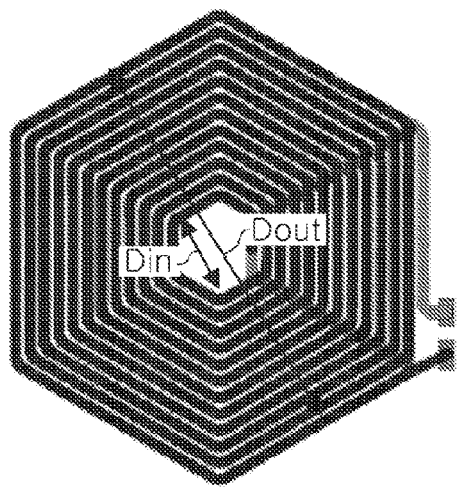
FIG. 17 is a top plan view illustrating an exemplary embodiment of a secondary core of the non-contact power-receiving apparatus in accordance with the present invention.

Below, with reference to FIG. 17, a more detailed description will be given of the efficiency of the secondary core 51 of the non-contact power-receiving apparatus 50 in accordance with the present invention.

When the coil has an inner diameter Din and an outer diameter Dout, inductance L can be calculated according to current sheet approximation as expressed in Equation 1 below:

$$L = \mu \times n^2 \times d_{avg} \times c_1 [ln(c_2/\rho) + c_3 \times \rho + c_4 \times \rho^2] \quad \text{(Equation 1)}$$

where $\mu$ is $4\pi \times 10^-$, n is a number of turn, $d_{avg}$ is $(d_{out}+d_{in})/2$, $\rho$ is $(d_{out}-d_{in})(d_{out}+d_{in})$, $c_1$ is 1.09, $c_2$ is 2.23, $c_3$ is 0, and $c_4$ is 0.17.

In addition, quality factor Q is calculated according to Equation 2 below:

$$Q = \omega L / R_{eq} \quad \text{(Equation 2)}$$

where $\omega$ is $2 \times \pi \times f$, L is inductance, f is frequency, and $R_{eq}$ is equivalent resistance.

Performance may be further improved in a case where the shielding section 35 as shown in FIG. 2 is provided compared to a case where the shielding section is not provided.

Figure 18:
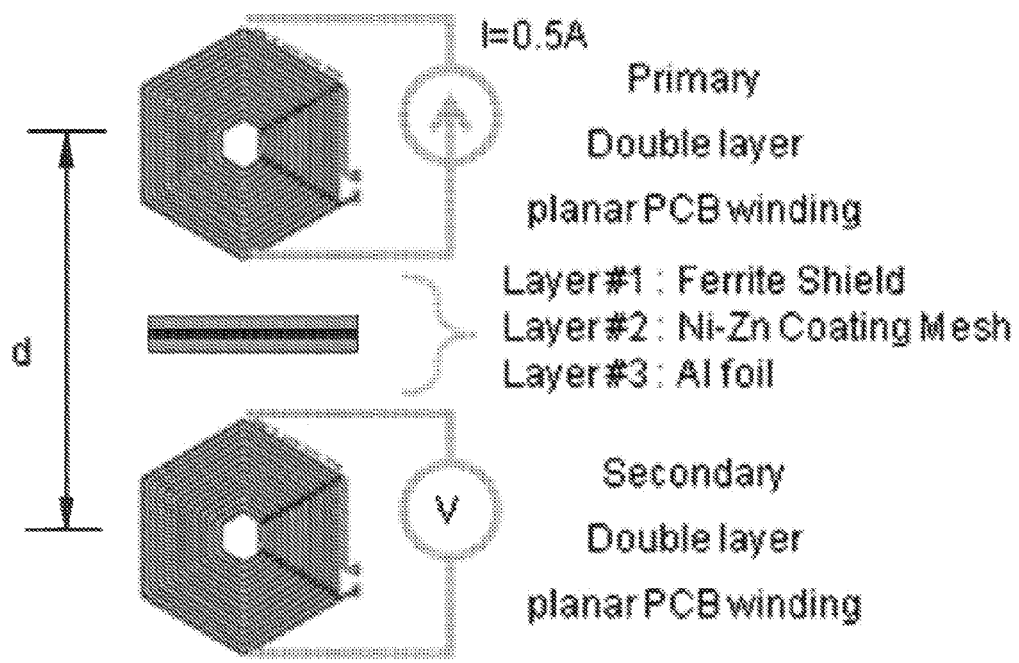
FIG. 18 is a top plan view illustrating a performance test performed on the secondary core of the non-contact power-receiving apparatus in accordance with the present invention.

In order to evaluate the characteristics of the planar spiral power transmission coil according to an exemplary embodiment of the present invention, as shown in FIG. 18, a constant current was allowed to flow through one coil to generate an induced magnetic field while a voltage generated by the magnetic field was measured from the other coil. In this test, an interval "d" was for example about 3 mm.

Here, the Shield Efficiency (SE) of an induced voltage in the case where the shielding section is provided can be expressed by Equation 3 below:

$$SE = 20 \log_{10}[V_{rms(without\ shield)}/V_{rms(with\ 3-layer\ shield)}] \quad \text{(Equation 3)}$$

where $V_{rms\ (without\ shield)}$ is an average voltage in the case where the shielding section is not provided, $V_{rms\ (with\ 3-layer\ shield)}$ is an average voltage in the case where the shielding section is provided, and rms is root mean square.

If an input current is 0.5 A, 170 mV was measured from $V_{rms\ (without\ shield)}$, but 0.5 mV was measured from $V_{rms\ (with\ 3-layer\ shield)}$ where the shielding section is provided. Accordingly, the resultant value can be expressed by Equation 4 below:

$$SE = 20 \log_{10}(170/0.5) = 50.62\ dB \quad \text{(Equation 4)}$$

Since 40 dB or more is generally average, the characteristic of about 50 dB explains that the improvement in performance was due to having the shielding section provided to the core.

As set forth above, the non-contact charging station having the planar spiral power transmission coil and the method for controlling the same in accordance with the present invention have been described.

Below, with reference to FIGS. 15, 19 and 20, a more detailed description will be given of the non-contact power-receiving apparatus 50 having the planar spiral power transmission coil in accordance with an exemplary embodiment of the present invention.

Figure 19:
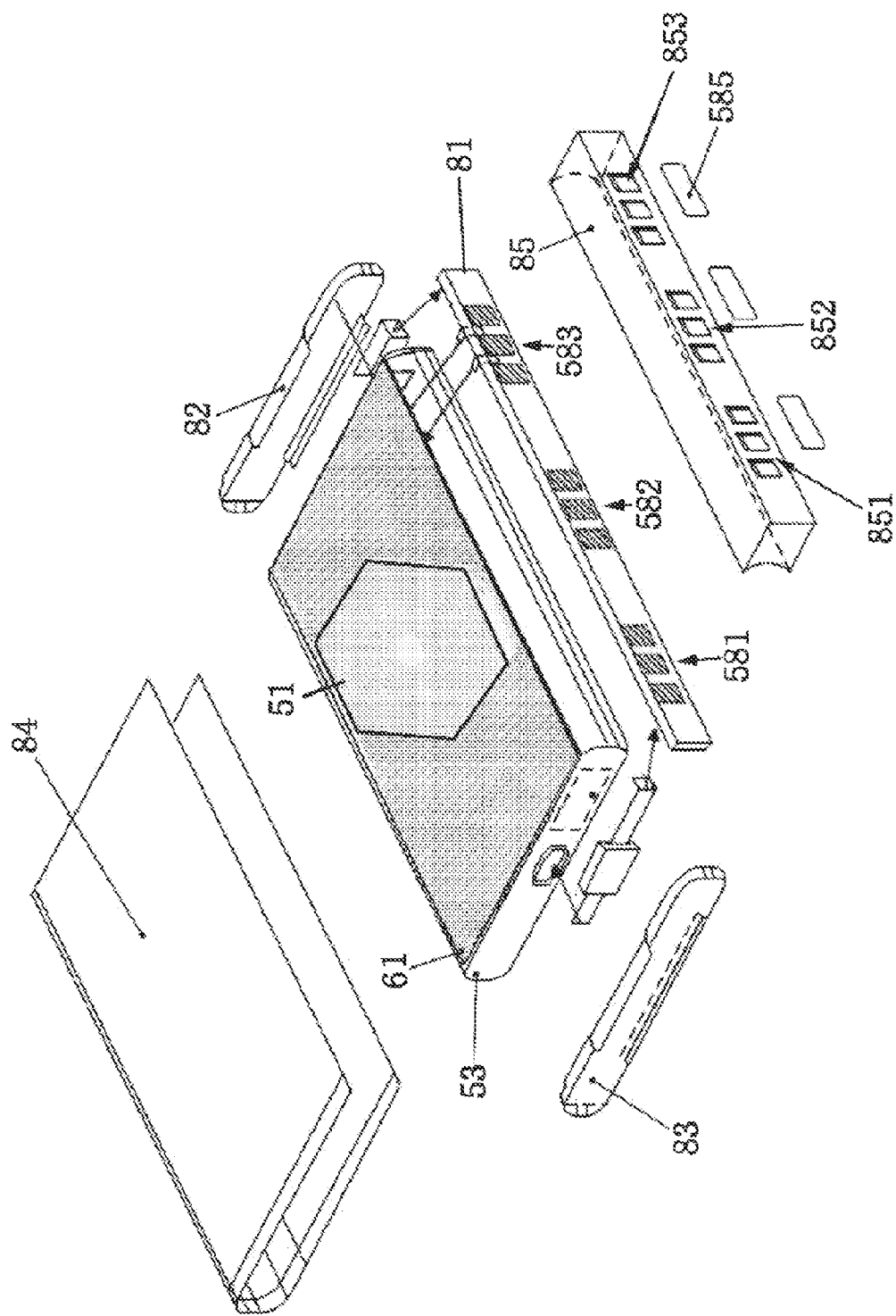
FIGS. 19 and 20 are exploded perspective views illustrating exemplary embodiments of the non-contact power-receiving apparatus in accordance with the present invention.
Figure 20:
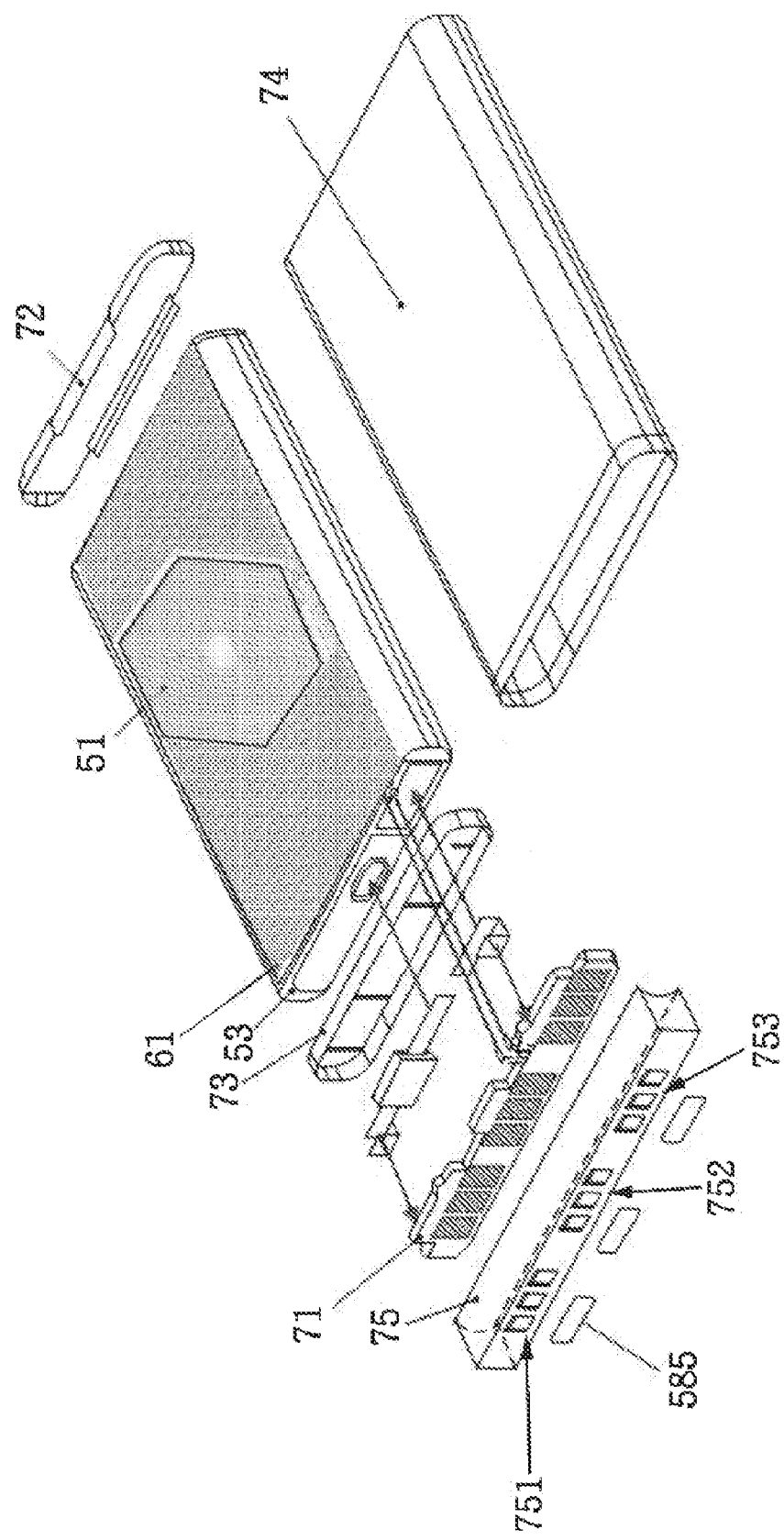

As shown in FIGS. 19 and 20, the non-contact power-receiving apparatus 50 in accordance with the present invention includes a charging PCB 71 or 81 on the front or side edge of the battery cell 53, respectively. Here, the battery pack controller 54 is provided to each of charging PCBs 71 and 81.

The charging PCB 71 on the front edge or the charging PCB 81 on the side edge has a terminal connector assembly 58 supplying electric power to the portable device. The terminal connector assembly 58 comes into contact with a connector of the portable device.

The terminal connector assembly 58 includes a plurality of connectors 581 to 583 (e.g., P+, P−, and ID) for supplying electric power from non-contact power-receiving apparatus 50 to the portable device. The connectors perform data signal transmission/receiving function in order to transmit information between the non-contact power-receiving apparatus 50 and the portable device. Thus, detailed data on the degree of charging and power transmission can be transmitted/received through the terminal connectors 58.

Of course, data from the computer C as shown in FIG. 1 and the like can be transmitted to the portable device by means of the non-contact charging station 10 and the non-contact power-receiving apparatus 50. Accordingly, in addition to the charging operation, data (e.g., upgrade data) can be transmitted through the computer C connectable over the Internet.

In addition, the battery cell 53 is coupled at the rear end with a rear case 72 or 82 and at the front end with a front case 73 or 83. The battery cell 53 is also coupled with an outside case 74 or 84, which surrounds the battery cell 53.

Briefly, the non-contact power-receiving apparatus 50 has the front charging PCB 71 coupled to the front edge of the battery cell 53 or the side charging PCB 81 coupled to the side edge of the battery cell 53.

Accordingly, the front charging PCB 71 coupled to the front end is disposed between the front case 73 and a front PCB case 75 so as to be connected to the connector of the battery cell 53 and thereby to the secondary core 51. In addition, the side charging PCB 81 coupled to the side edge is disposed between the side PCB case 85 coupled to the battery cell 53 so as to be connected to the connector of the battery cell 53 and thereby to the secondary core 51.

Each of the charging PCBs 71 and 81 includes a rectifier block 52 connected with the secondary core 51 to rectify an induced current, a battery pack controller 54 processing data transmitted/received by the secondary core 51, a charging circuit block 55 charging electric power from the rectifier block 52 to the battery cell 53 under the control of the battery packet controller 54, a charge monitor circuit 56 monitoring the level of charge of the battery cell 53 and transmitting a signal notifying that the battery cell 53 is fully charged or is discharged to the battery pack controller 54, and the like.

As a result, the induced current generated by the secondary core 51 provided on top of the battery cell 53 is rectified by the rectifier block 52 of the charging PCB 71 or 81, and is then charged through the connector of the battery cell 53 under the control of the battery pack controller 54. Thereby the electric power is supplied to the portable device through the terminal connector assembly 58 by the battery pack controller 54, the charging circuit block 55, and the like.

The terminal connector assembly 58 includes a central connector 582 arranged in a central portion, a left connector 581 arranged to the left of the central connector 582, and a right connector 583 arranged to the right of the central connector 582.

As such, since one non-contact power-receiving apparatus 50 is provided with the left connector 581, the central connector 582, and the right connector 583, the non-contact power-receiving apparatus 50 can be applied to various types of portable devices. According to the position of a power connector of a portable device coupled with the non-contact power-receiving apparatus 50, at least one of the left connector 581, the central connector 582, and the right connector 583 of the terminal connector assembly 58 can come into contact with the power connector of the portable device.

Accordingly, the non-contact power-receiving apparatus 50 can be applied without modification to any type of portable device M. This as a result increases the range of applications where the non-contact power-receiving apparatus can be mounted, improving its applicability.

In particular, since portable devices such as a portable phone, a PDA, a PMP, an MP3 player, and a DMB are provided from a plurality of distinct manufacturers, the terminal connectors coming into contact with the non-contact power-receiving apparatus 50 as a respective battery pack can be provided in various forms according to the manufacturers.

The non-contact power-receiving apparatus with the planar spiral power transmission coil in accordance with the present invention includes a variety of connectors such as the left connector 581, the central connector 582, and the right connector 583 so as to be constantly applied to various types of portable devices. Accordingly, the non-contact power-receiving apparatus in accordance with the present invention can be advantageously applied to all types of portable devices.

In addition, left connector holes 751, central connector holes 752, and right connector holes 753 are formed in the front PCB case 75 in positions corresponding to the left connector 581, the central connector 582, and the right connector 583 of the terminal connector assembly 58 of the charging PCB 71 such that the power connector of the portable device is connected to the left connector 581, the central connector 582, or the right connector 583. Likewise, left connector holes 851, central connector holes 852, and right connector holes 853 are formed in the front PCB case 85 in positions corresponding to the left connector 581, the central connector 582, and the right connector 583 of the terminal connector assembly 58 of the charging PCB 71.

Hole covers 585 are coupled with the left connector holes 751 or 851, the central connector holes 752 or 852, and the right connector holes 753 or 853, respectively.

Accordingly, only one of the hole covers 585 of the terminal connector assembly 58 to be used is opened, but the other hole covers which will not be used are configured to be closed maintaining the coupled state. This as a result can prevent impurities or moisture from entering through the unused holes, which would otherwise cause an abnormal operation of the non-contact power-receiving apparatus 50.

Figure 15:
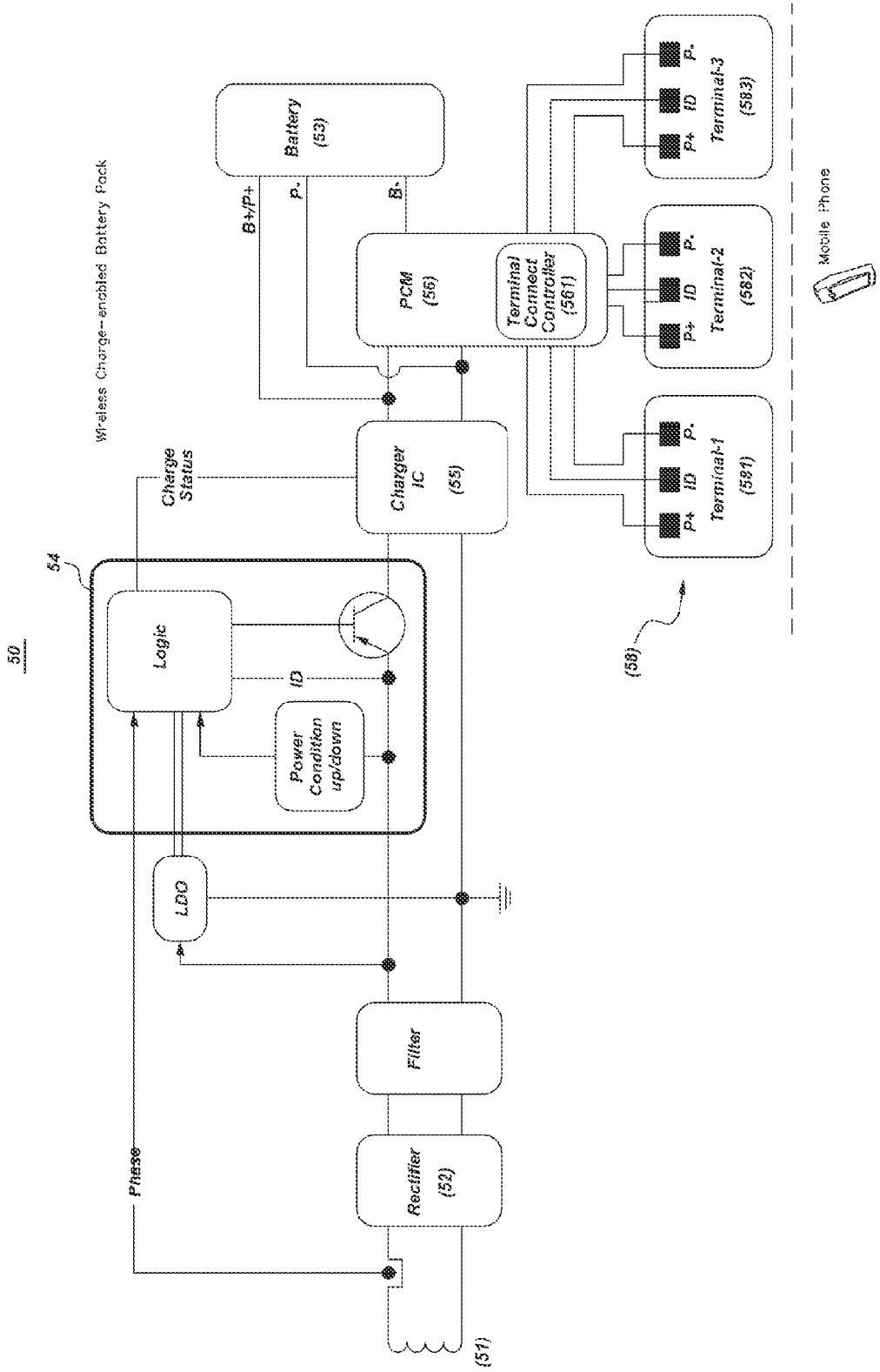
FIG. 15 is a block diagram illustrating another exemplary embodiment of the non-contact power-receiving apparatus having a planar spiral power transmission coil in accordance with the present invention.
Figure 16:
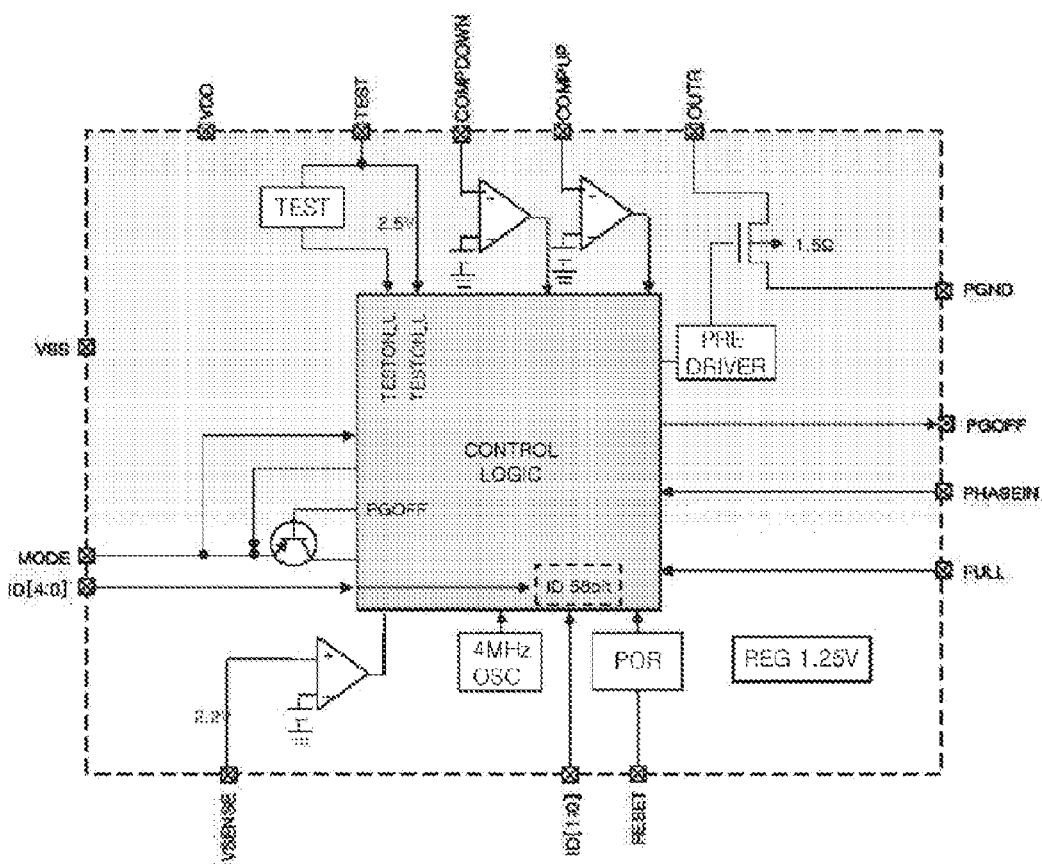
FIG. 16 is a circuit diagram illustrating one exemplary embodiment of the battery pack controller shown in FIG. 13.

In addition, as shown in FIG. 15, the charge monitor circuit 56 can have a connector controller 561 that controls electric power to be transmitted to one of the left connector 581, the central connector 582, and the right connector 583 of the terminal connector assembly 58.

In accordance with an exemplary embodiment of the present invention, as shown in FIG. 15, the connector controller 561 provided in the charge monitor circuit is illustrated as controlling electric power to be supplied to only one of the left connector 581, the central connector 582, and the right connector 583 corresponding to the power connector of the portable device M. Thus, the hole cover 585 of one of the left connector 581, the central connector 582, and the right connector 583 of the terminal connector assembly 58 corresponding to a power connector (not shown) of the portable device is removed so that the corresponding connector is connected to the power connector of the portable device. Afterwards, when the portable device is coupled with the non-contact power-receiving apparatus 50, the portable device and the non-contact power-receiving apparatus 50 are electrically connected with each other via the connectors.

The battery pack controller 54 then detects the electric connection between the corresponding connectors, and the battery pack controller 54 responsively transmits a switch control signal so that electric power is connected to the corresponding connector via the connector controller 561.

In contrast, the connector controller 561 performs a switching operation under the control of the battery pack controller 54 so that electric power is not connected to the other two connectors.

Accordingly, since the unused connectors are not electrically connected even if impurities are adhered, neither the non-contact power-receiving apparatus 50 nor the portable device is damaged.

A non-contact charging station with a planar spiral power transmission coil, a non-contact power-receiving apparatus, and a method for controlling the same have been described above. As set forth above, it is to be appreciated that those skilled in the art can make substitutions, or change or modify the embodiments into various forms without departing from the scope and spirit of the present invention.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A non-contact power-receiving apparatus which receives induced electric power for charging from a non-contact charging station, the power signal being caused by an induced magnetic field, the non-contact power-receiving apparatus comprising:
    a secondary core which receives a first signal for selecting a primary core from each of multiple primary cores included in the non-contact charging station in a standby mode, transmits a response signal including information on received signal intensity of the first signal to the non-contact charging station, and transmits a second signal for power control including information regarding a degree of voltage calibration to the non-contact charging station in a charging mode;
    a rectifier block connected with the secondary core to rectify an induced current in the secondary core; and
    a controller which detects the received signal intensity of the first signal and, processes the response signal in the standby mode and the second signal in the charging mode,
    wherein the secondary core includes a shielding section for shield the magnetic field, from other electronic elements mounted on the non-contact power-receiving apparatus,
    wherein the secondary core receives the induced electric power for charging from a primary core which is selected based on the information on the received signal intensity of the first signal and receives a compensated electric power according to the information regarding the degree of voltage calibration from the non-contact power charging station in the charging mode,
    wherein charging operation is stopped when it is detected that metallic object other than the non-contact power-receiving apparatus is placed on the non-contact power charging station, and
    wherein the selected primary core has the best received signal intensity for the first signal among the multiple primary cores.

2. The non-contact power-receiving apparatus in accordance with claim 1, wherein the response signal further includes a unique ID of the non-contact power-receiving apparatus.

3. The non-contact power-receiving apparatus in accordance with claim 1, further comprises:
a charge circuit block allowing electric power supplied from the rectifier block to be charged to a battery cell; and
a charge monitor circuit block monitoring a level of charge of the battery cell.

4. The non-contact power-receiving apparatus in accordance with claim 1, wherein the shielding section includes a shielding panel, a shielding mesh, and a metal thin film.

5. The non-contact power-receiving apparatus in accordance with claim 1, wherein the secondary core has a pattern core on a printed circuit board base, which is fastened to an inside of the non-contact power-receiving apparatus, and wherein the pattern core comprises a planar-spiral power transmission core.

6. The non-contact power-receiving apparatus in accordance with claim 1, wherein the response signal further includes a unique ID of each of the multiple primary cores.

7. A method of receiving induced electric power for charging from multiple primary cores of a non-contact charging station performed by a non-contact power-receiving apparatus, the method comprising:
receiving, at a secondary core of the non-contact power-receiving apparatus, a first signal for selecting a primary core from each of multiple primary cores in a standby mode;
detecting received signal intensity of the first signal in the standby mode;
transmitting, to the non-contact charging station, a response signal including information on received signal intensity of the first signal in the standby mode;
receiving at the secondary core, the induced electric power for charging from a primary core which is selected based on the information on the received signal intensity of the first signal in a charging mode, wherein the selected primary core has the best received signal intensity for the first signal among the multiple primary cores;
transmitting, to the non-contact charging station, a second signal for power control including information regarding a degree of voltage calibration; and
receiving at the secondary core, a compensated electric power according to the information regarding the degree of voltage calibration from the non-contact power charging station in the charging mode,
wherein the secondary core includes a shielding section for shield a magnetic field, from other electronic elements mounted on the non-contact power-receiving apparatus, and
wherein charging operation is stopped when it is detected that metallic object other than the non-contact power-receiving apparatus is placed on the non-contact power charging station.

8. The method in accordance with claim 7, wherein the response signal further includes a unique ID of each of the multiple primary cores.

* * * * *